Patented June 17, 1941

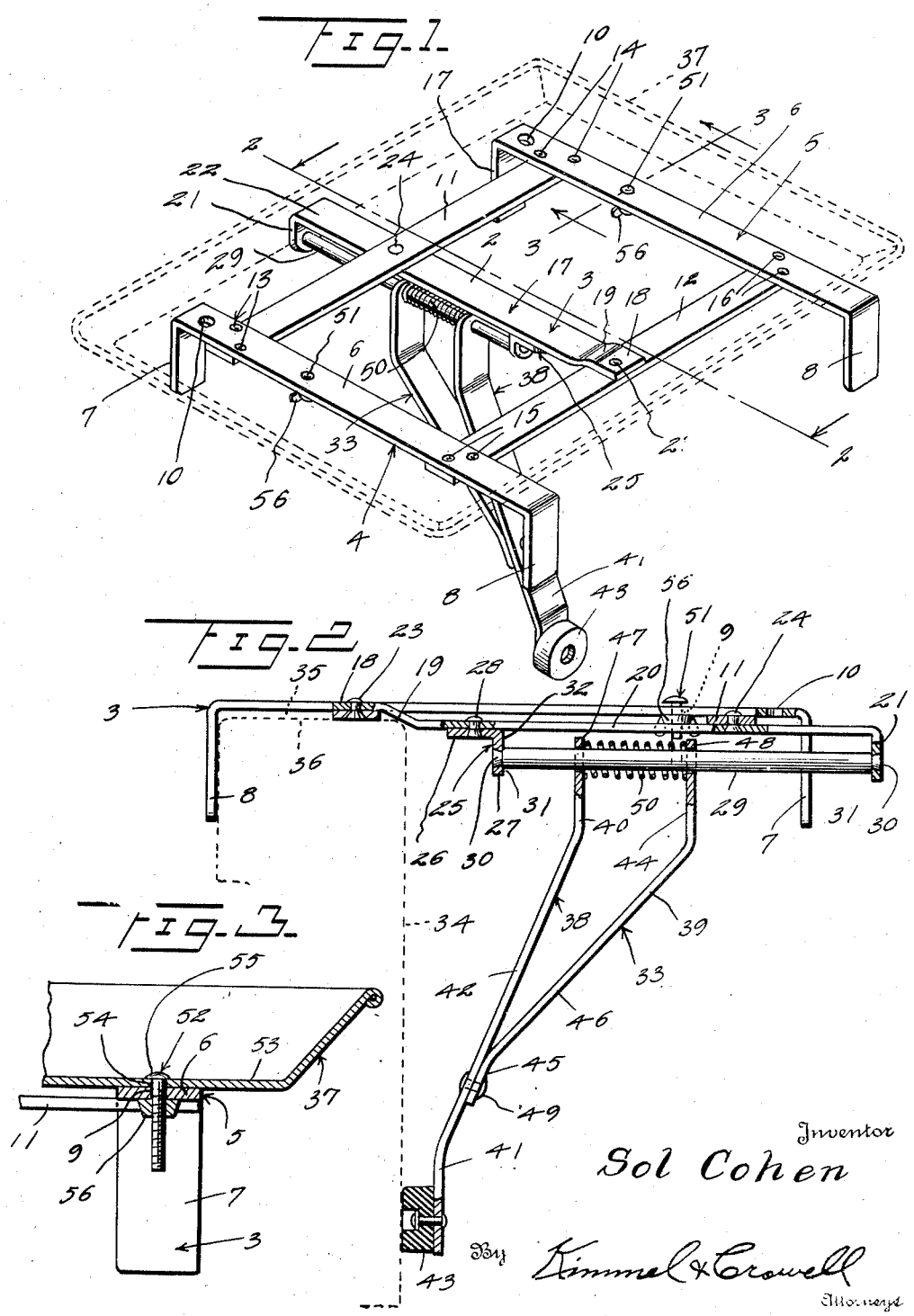

2,246,432

UNITED STATES PATENT OFFICE 2,246,432

TRAY SUPPORT

Sol Cohen, Atlanta, Ga.

Application December 5, 1939, Serial No. 307,679

2 Claims. (Cl. 311—22)

This invention relates to a portable tray support.

The invention aims to provide, in a manner as hereinafter set forth, a support of the class referred to for carrying a tray containing edibles or drinkables from a point of supply and for rigidly supporting it in laterally extended relation with respect to a window of an automobile.

The invention further aims to provide, in a manner as hereinafter set forth, a support of the class referred to upon which the tray is mounted and with the support including means whereby the tray may be secured thereto in selected varying laterally extended positions with respect to a side of said support.

The invention further aims to provide, in a manner as hereinafter set forth, a support for the purpose referred to, whereby the tray mounted thereon may be rigidly supported, coupled with and extended into a window opening of an automobile to facilitate an occupant of the automobile having convenient access to the contents of the tray.

The invention further aims to provide, in a manner as hereinafter set forth, a structure of the type referred to which is simple in its construction and arrangement, strong, durable, compact, conveniently handled, thoroughly efficient in the use intended thereby and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a perspective view of the portable tray support further illustrating in dotted lines the tray mounted thereon, Figure 2 is a section on line 2—2 Figure 1, and Figure 3 is a section on line 3—3 Figure 1 with the tray shown in full lines.

The structure, generally indicated at 3, is of frame-like form and it includes a pair of inverted yoke-shaped side bars 4, 5 of like form and disposed in parallel spaced relation. Each side bar includes a bight 6 and a pair of depending arms 7, 8. The bight of each side bar, at a point between the transverse median of the bight and the arm 7, is formed with an opening 9. The bight 6 between the opening 9 and the arm 7 is formed with an opening 10. The purpose of the openings 9 and 10 will be hereinafter referred to. The openings 9, 10 in the bight 6 of the bar 4 align respectively with the openings 9, 10 in the bight 6 of the bar 5.

The arms 7 are disposed in spaced alignment and arranged at the front of the structure. The arms 8 are arranged in parallel spaced alignment and arranged in the rear of the structure 3.

The bars 4, 5 are connected together by a pair of spaced parallel combined bracing and coupling members 11, 12 of strap-like form. The members 11, 12 are arranged below the bights 6 of the bars 4, 5. The ends of the member 11 are connected to the bights 6 of the bars 4, 5 by the holdfast means 13, 14. The ends of the member 12 are connected to the bights 6 of the bars 4, 5 by the holdfast means 15, 16. The holdfast means 13, 14 are disposed in proximity to the openings 10. The holdfast means 15, 16 are disposed between the transverse medians of the bights 6 and the arms 7 of the bars 4, 5. The arms 7, 8 of the bars 4, 5 are of less length than the bights 6 of such bars. The members 11, 12 are of the same length as the bights 6 of the bars 4, 5.

At the transverse median of the structure 3 it is formed with a strap-like support 17 consisting of an upper end portion 18, an intermediate portion 19, a lower end portion 20 and a depending lug 21 formed at the outer end of the end portion 20. The lug 21 is provided with an opening 22. The portion 18 is of materially less length than the portion 20. The portion 19 is of materially less length than the portion 20 and extends forwardly at a downward inclination from the portion 18 to the portion 20. The portion 18 is secured upon the upper face of the member 12 by the holdfast means 23. The portion 20 is secured intermediate its ends against the lower face of the member 11 by the holdfast means 24. Secured against the lower face of the portion 20 of the support 17 in proximity to the portion 19 of such support is a depending angle shaped bracket 25 formed of a horizontal leg 26 and a vertical leg 27. The leg 27 depends from the forward end of the leg 26, and the latter is secured to the portion 20 of support 17 by the holdfast means 28. Arranged below and disposed in spaced relation to the portion 20 of the support 17 is a carrier 29 in the form of a bar of circular cross section. The ends 30 of the carrier 29 are reduced, thereby forming the latter with a pair of shoulders 31. The shoulders 31 abut against the forward face of the leg 27 and against the rear face of the lug 21. One of the reduced ends 30 of the carrier 29 is countersunk in the opening 22 formed in the lug 21. The other reduced end 30 of the carrier 29 is countersunk in an opening 32 formed in the leg 27 of the flange 25. The shoulders 31 coact with the lug 21 and the leg 27 to prevent the carrier 29 shifting lengthwise with respect to the support 17.

The support 3 includes a bracing element 33, which correlates with the arms 8 and front of the body 34 of the automobile below the window opening 35 for not only supporting the structure 3 in laterally extended relation with respect to the sill 36 of said opening 35, but also for detachably clamping the structure 3 to the automobile body and in this connection when structure 3 is clamped with body 34 the arms 8 abut the inner face of such body. The tray, which is selectively secured at different points of the structure 3 is indicated at 37 and it is shown in dotted and full lines respectively in Figures 1 and 3. The bracing element 33 is of sectional form and includes rear and front sections 38, 39 respectively of strap-like form. The section 38 is of greater length than the section 39 and it is formed of an upper end part 40, a lower end part 41 and an intermediate part 42 connecting end parts 40 and 41 together. The parts 40, 41 are disposed in parallel planes and with the part 40 arranged forwardly of the part 41. The intermediate part 42 extends upwardly from the part 41 at a forward inclination to the part 40 and is of materially greater length than said parts 40, 41. Secured to the rear face of the lower end part 41 of the section 38 is a cushioning member 43 which, when element 43 is in active position, bears against the outer face of the body 34 of the automobile, as is shown in Figure 2. The section 39 consists of an upper end part 44, a lower end part 45 and an intermediate part 46. The part 44 of the section 39 is disposed in a plane parallel to the plane in which the end part 40 of section 38 is arranged. The parts 40, 44 are disposed in spaced relation and in proximity to their upper ends are formed with aligned openings 47, 48 respectively. The part 45 is disposed at an inclination with respect to the part 44 and it abuts and is secured by the holdfast means 49 against the front face of the part 42 of the section 38. The part 46 extends upwardly at a forward inclination from the part 45 to the part 44 of the section 39. The element 33 is loosely mounted on the carrier 29 and for such purpose the carrier 29 extends through the openings 47, 48. Arranged on the carrier 29 between the parts 40, 44 of the sections 38, 39 respectively, as well as bearing against said parts is a coiled spring 50 for maintaining such parts in extended relation.

The structure 3 includes a pair of detachable coupling devices 51, 52 of like form for selectively engaging with the pair of openings 9 or the pair of openings 10 for detachably securing the tray 37 upon the upper face of the structure 3. The bottom 53 of tray 37 is formed with a pair of aligned openings 54 through which the pair of holdfast devices extend for detachably securing the tray to the support 3. As shown, the holdfast devices 51, 52 are extended through the pair of openings 9. Each of the holdfast devices, with reference to Figure 3, includes a headed threaded bolt 55 and a winged nut 56, which correlates with the threaded shank of the bolt 55. When a holdfast device is employed, the bolt thereof extends down through an opening 54, an opening in a bight 6 which aligns with the opening 54 and the nut 56 is screwed home on the bolt 55 to abut against the lower face of the bight 6. When the openings 54 in the bottom 53 of the tray 37 register with the openings 10, the tray 37 will be extended a greater distance outwardly relative to the structure 3, than what is shown in Figure 1, to permit of the arm of an occupant of an automobile to extend a greater distance from the latter when removing the contents of the tray.

When it is desired to remove the structure 3 from coupled relation with respect to the body of the automobile the bracing element 33 is shifted outwardly on the carrier 29 from its engagement with the automobile body 34 and the structure 3 is then lifted to clear the window sill and it then can be transported to any point desired. When lifted to clear the window sill, the bracing element 33 is swung in either direction to a position parallel to the side bars 4, 5 and when transporting the tray the element 33, in such position, is gripped by the person which transfers the structure to the point desired and when transporting, preferably element 33 will be held in the position aforesaid. It is also obvious that the attendant may grip the support 17 when transporting the tray from place to place.

The tray is to be secured to the structure 3 when carried, whereby said structure will always have secured thereto a tray, overcoming the necessity of successively providing a different tray for a support, and by this arrangement the loss of trays is materially reduced.

What I claim is:

1. In a portable support for a serving tray, a pair of inverted yoke-shaped side bars each including a bight and front and rear arms, front and rear spaced parallel couplers disposed at right angles to and having the upper faces of their end terminal portions secured to the lower faces of said bight and spaced inwardly from said arms, a supporting member disposed at the transverse medians of and disposed at right angles to said couplers, said member having its rear terminal portion offset, arranged on and secured to the upper face of said rear coupler, said member having its remaining portion arranged below and extended forwardly of said front coupler, said remaining portion being secured intermediate its ends to the lower face of said front coupler, said member being formed at its forward end with a depending apertured lug, an apertured angle-shaped depending element secured to the lower face of said member forwardly of and in proximity to said rear terminal portion, said element having its aperture aligned with the aperture in said lug, a cylindrical rod-like carrier disposed below, spaced from and aligned with the said remaining portion of said member and having its ends fixed in the said aligned apertures, said bights being apertured, a bracing structure including a pair of arms connected at their lower ends and having spaced parallel apertured upper end portions slidably mounted on said carrier, a controlling spring mounted on the carrier between and bearing against said portions, and a pair of removable coupling devices coacting with the apertures of the bights and adapted to correlate with the bottom of the tray for detachably securing the latter on said bights.

2. In a portable supporting device for a serving tray, a pair of inverted substantially U- shaped or yoke-shaped side bars, each including an apertured bight and front and rear arms, front and rear spaced couplers disposed at right angles to and having faces of their end terminal portions secured to the under faces of said side bars, a supporting member disposed at the transverse medians of said couplers and in an alignment parallel to said side bars, said member being secured adjacent its terminal portions respectively to said couplers, said member having spaced depending apertured portions, said apertures being in alignment with each other for the reception of a cylindrical rod-like carrier, a cylindrical rod-like carrier disposed below, spaced from and aligned with the remaining or body portion of said member and having its ends fixed in said aligned apertures, a bracing structure including a pair of arms connected adjacent their lower ends, and having spaced apertured upper end portions slidably mounted on said carrier-rod, a controlling spring mounted on the carrier between and bearing against said spaced end portions of said arms of said bracing structure, said apertures in said bights being for the reception of holdfast devices for securing a tray to said supporting device.

SOL COHEN.